United States Patent [19]
Graves

[11] Patent Number: 4,803,953
[45] Date of Patent: Feb. 14, 1989

[54] CAT TOY
[76] Inventor: Michael S. Graves, 10409 Valley Spring La., Toluca Lake, Calif. 91602
[21] Appl. No.: 104,292
[22] Filed: Oct. 5, 1987
[51] Int. Cl.$^4$ ............................................. A01K 15/00
[52] U.S. Cl. ...................................... 119/29; 446/310; 124/16
[58] Field of Search .................. 119/29; 446/309, 310, 446/435, 448, 449, 473; 124/16, 29, 39, 41 R
[56] References Cited
U.S. PATENT DOCUMENTS

| | | | |
|---|---|---|---|
| 1,379,126 | 5/1921 | Reppe | 124/39 X |
| 1,759,128 | 5/1930 | Marx | 124/29 |
| 2,917,038 | 2/1958 | Handley | 124/29 |
| 3,213,844 | 10/1965 | Riva | 446/448 X |
| 4,457,098 | 7/1984 | Tsuzuki | 446/435 |

Primary Examiner—Gene Mancene
Assistant Examiner—R. Thomas Price
Attorney, Agent, or Firm—Roger A. Marrs

[57] ABSTRACT

A cat toy is disclosed herein having a stationary base housing a take-up reel storing a length of line with a weighted end. A motor and resilient propulsion unit are pivotally carried as an assembly on the base wherein energy is stored in the propulsion unit in response to drawing of the line onto the reel by the motor. Gear means are selectively coupled with the reel for driving the reel so as to withdraw the line. The pivotal connection of the motor/propulsion unit assembly provides an over-the-toggle mechanism responsive to the storage of energy in the propulsion unit to disengage the motor from the reel to release the stored energy for tossing the weighted end of the line from the propulsion unit.

2 Claims, 1 Drawing Sheet

U.S. Patent
Feb. 14, 1989
4,803,953
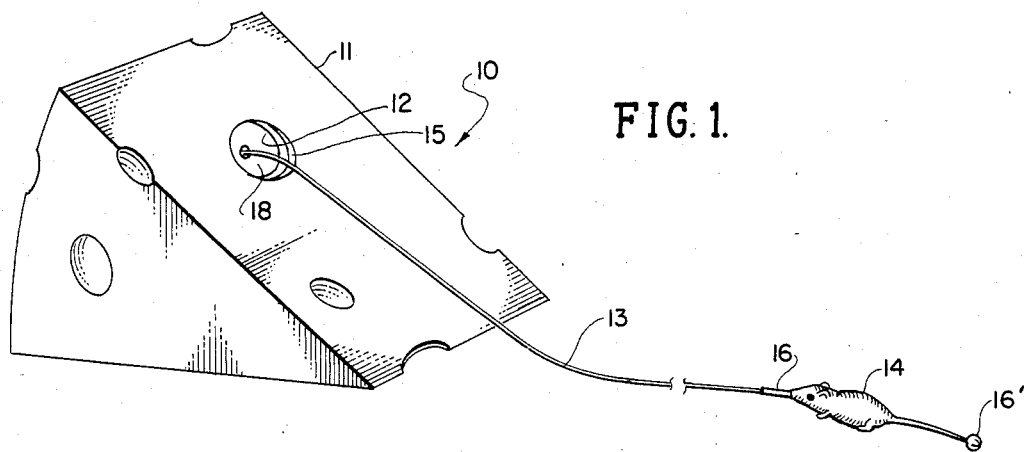
FIG. 1.
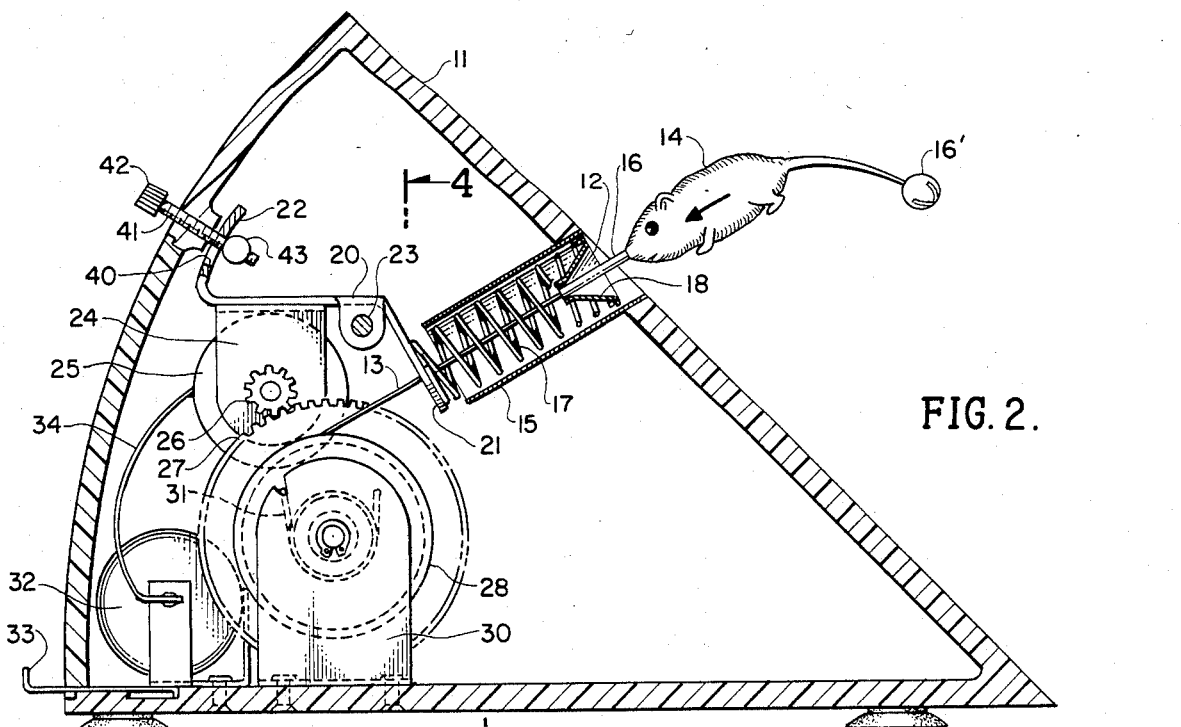
FIG. 2.
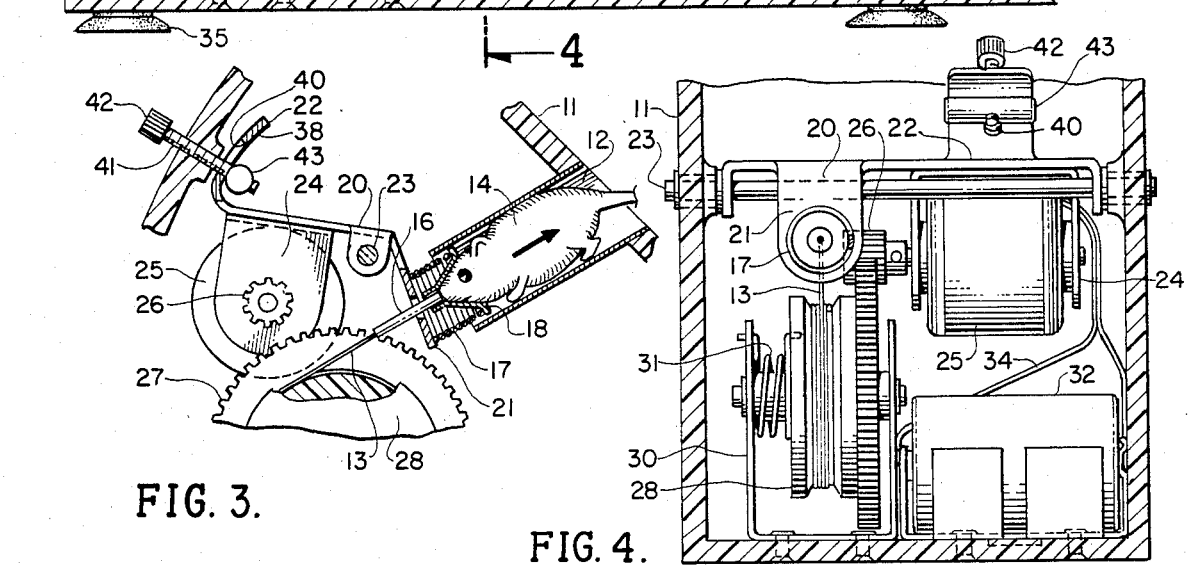
FIG. 3.
FIG. 4.

CAT TOY

BACKGROUND OF THE INVENTION

1. Field of the Invention

The present invention relates to amusement devices and more particularly to a novel toy for animals which includes a stationary base having a propulsion means for tossing a tethered weighted object a short distance, followed by drawing the object across the floor so that it may be chased or played with by an animal, such as a cat.

2. Brief Description of the Prior Art

In the past, it has been the conventional practice to throw or toss a weighted object, such as a mock mouse, across the floor for the amusement of a cat. The weighted object is not tethered and usually no movement is provided for the weighted object which would normally attract or amuse the animal. In some instances, launchers have been provided for tossing the object or article a short distance so that the human element is removed from the arena in which the animal is intended to play with the weighted object. In other instances, launching tubes, including coil spring means, are employed for tossing objects such as missiles across the room, and in other situations, motor means are sometimes used to bring the weighted object back to the starting position.

However, problems and difficulties have been encountered with these prior art devices in that there is no coordination or cooperation between the propulsion and retraction so that the same mechanism can be interrelated to achieve both functions. By incorporating a means for both propulsion and retraction, hands-off operation of the device is available to the user so that the user may sit back and watch the playful activities of an animal with the weighted object as it is alternately being propelled outwardly and withdrawn inwardly from the base.

Therefore, it is among the primary objects of the present invention to provide a novel toy for animals, such as cats, which will permit the tossing or propelling of a weighted object, such as a mouse or the like, that is tethered to a real mechanism so that upon release during the propulsion procedure, retraction mechanism takes over for recovering or withdrawing the weighted object back to its starting position for propelling or tossing the object again.

SUMMARY OF THE INVENTION

Accordingly, the above problems and difficulties are obviated by the present invention which provides a novel device for tossing or propelling an object outwardly by retrieving the object back to a starting position for again tossing or propelling outwardly. The device includes a stationary base housing a take-up reel to which is attached a weighted object by means of a line tether. The weighted object may take the form of an animal attractive to other animals, such as cats, for example. A motor means and expansion spring means are cooperatively carried on a pivot connection adjacent to the reel mechanism, and adapted to pivot between a propelling position and a retracting position. In the propelling position, the expansion spring is permitted to expand for tossing the weighted object from a tube on the base so that the tethering line is pulled from the reel mechanism. The other position resides in the motor means pivoted into engagement with a gear train of the reel mechanism so that the reel is forcibly driven to withdraw the tethered weighted object back into the storage tube while contracting the expansion spring.

The stored energy of the expansion spring, when contracted, causes the driving mechanism to pivot about the pivot connection so that disengagement occurs between the motor means and the reel assembly. However, once the spring has been totally contracted, the reel is loose and unwinds as the spring expands to propel or toss the weighted object. Once released, the pivot mount for the motor means rotates so that the motor means is engageable with the gear train of the reel mechanism so that the weighted object is withdrawn back into the storage tube to contract the spring while the line is being stored on the reel. The sequence is repeated over and over as long as power is provided to the motor means.

Therefore, it is a primary object of the present invention to provide an automatic tossing and retracting means for a weighted object which may be used as a plaything for an animal whereby the object is initially tossed and then retracted in a manner which is conducive for the amusement of the animal.

Another object of the present invention is to provide a novel creative playtoy for animals which includes a stationary housing having a motor means and a spring means carried on a mount by means of a pivot connection so that the motor means alternately engages and disengages with a reel mechanism capable of releasing a tethered weighted object in response to expansion of the spring means and capable of withdrawing the tethered object in response to engagement with the motor means.

Yet another object of the present invention is to provide an automatic toy for animals having the capability of tossing a tethered weighted object outwardly, followed by automatic withdrawal of the weighted object back to a storage position where the tossing and retraction procedure is repeated over many cycles in an automatic manner.

Another object of the present invention is to provide a novel playtoy for animals, such as cats, which will rapidly permit the release and tossing of a tethered weighted object, such as a simulated mouse, followed by controlled and uneven retrieval of the tethered object so as to create interest and amusement for an animal such as a cat.

Yet a further object of the present invention is to provide a novel playtoy for a cat, having a tossing or propelling mechanism and a withdrawal mechanism cooperatively mounted on a pivot connection to a stationary base for permitting the tossing and automatic withdrawal of the weighted object throughout a cycle of propulsion and retraction procedures.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view showing the novel amusement apparatus incorporating the present invention;

FIG. 2 is an enlarged longitudinal cross-sectional view of the novel amusement apparatus for animals as shown in FIG. 1;

FIG. 3 is a fragmentary view similar to the view of FIG. 2, illustrating the tethered weighted object in the retracted storage position on the housing; and FIG. 4 is a transverse cross-sectional view of the apparatus shown in FIG. 2 as taken in the direction of arrows 4—4 thereof.

DESCRIPTION OF THE PREFERRED EMBODIMENT

Referring to FIG. 1, the novel amusement apparatus for animals, such as cats, is illustrated in the general direction of arrow 10 which includes a base 11 taking the form of a slice of Swiss cheese and having an opening 12 provided therein through which a line 13 passes. One end of line 13 is attached to a weighted object such as a simulated mouse, which is attractive to a cat. It is to be understood that although a mouse is illustrated and discussed, other weighted objects taking different forms, shapes and characteristics may be used. Disposed immediately behind the opening 12 and coaxially disposed therewith, there is provided a storage tube 15 for either housing the weighted object 14 or, as illustrated, housing a rigid shaft 16 so that the weighted object substantially remains outside of the stationary housing 11. If desired, the weighted object 14 may include a noisemaking device, such as a bell 16'.

Referring now in detail to FIG. 2, it can be seen that the housing 11 is hollow and that the tube 15 projects inwardly so as to store an expansion spring of the helical type as indicated by numeral 17. One end of the spring bears against a conically shaped element 18 positioned at the entrance of the opening 12, while its opposite end is attached to a mount 20 by means of a flange 21. An opposite flange 22 is carried on the mount so that flange 21 and flange 22 are separated by a pivot connection to the housing 11 wherein the pivot connection is illustrated by numeral 23. The flange 22 includes a yoke 24 for mounting a motor 25. The motor driveshaft is attached to and terminates with a pinion gear 26 that is selectively in engagement with a drive gear 27 carried on a reel mechanism 28. A bracket 30 rotatably carries the reel 28 and a biasing spring 31 places a lateral bias on the reel to provide smooth rotation. A power source in the form of a battery 32, as illustrated, is carried adjacent to the bracket 30 and includes a manually operated switch capable of placing the poles of the battery into and out of electrical and mechanical contact with the motor 25. Wires 34 interconnect the terminals of the battery and the contact with the motor means 25. The base or housing 11 is releasably secured to the floor by means of a suction cup 35. Other means may be employed, such as a hook and pile fastener, as well as other means, so that the base or housing is maintained in a stationary position during the cycle of operation between the tossing portion of the cycle and the retracting portion of the cycle.

Referring now in detail to FIG. 4, it can further be seen that the mount 20 is pivotally supported on a pivot connection 23 carried on the base or housing 11. The tube 15 is not illustrated in this sectional view, nor is the expansion spring 17. However, the flange 21 attached to the mount 20 is illustrated on which the spring 17 is carried. It is noted that the tube, as shown in FIG. 3, is fixedly secured to the front wall of the housing while one end of the spring 17 is attached and carried on the flange 21. The line 13 is illustrated as being wound about the center portion of the reel 28.

Referring now in detail to FIG. 3, the device is illustrated in a fully retracted condition preparatory for tossing of the tethered object from the opening 12. It can be seen that the reel has been fully rotated counterclockwise so that the full length of line 13 is wound about the center portion of the reel drawing the weighted article into the opening 12 with its shaft extending through a central hole in the conical element 18. The shaft is indicated by numeral 16 and is fixed to the weighted object on one of its ends and secured to the terminating end of the line 13 on its opposite end. In this position, the mount 22 has been fully rotated clockwise so that the pinion gear 26 is out of mesh with the reel drive gear 27. When the pinion is out of mesh, the reel is permitted to rotate in a clockwise direction since the spring 17 will expand, urging the weighted object to be propelled outwardly and drawing the line 13 from the reel. After such expansion of spring 17, the weight of the motor 25 on flange 22 will cause the mount 20 to rotate in a counterclockwise direction which would again engage the pinion 26 with the drive wheel 27 so that the reel will operate in a counterclockwise direction to wind and reel in the weighted object.

In FIGS. 2 and 3, it is also to be noted that a limit stop means is provided for limiting the amount of clockwise and counterclockwise rotation of the mount 20 about the pivot connection 23. The limit means includes an arcuate bracket 38, having a slot 40 into which the shank 41 of a threaded screw projects. One end of the shank includes a thumb knob 2, while its opposite end includes a ball or roller 43. When the shank is engaged with the top of the slot 40, as shown in FIG. 2, counterclockwise rotation is stopped while engagement of the shank with the lower or opposite end of slot 40, as shown in FIG. 3, terminates clockwise rotation of the mount 20.

Therefore, it can be seen that the alternate movement of the mounting means between a clockwise and counterclockwise direction as limited by the limit means causes the motor means to be placed into and out of driving relationship with the reel. Clockwise movement of the mount 20 is under control and in response to contraction of spring 17 by engagement with the weighted object with element 18 and the forcible urging on the weighted object by line 13 as it is wound about the reel. Such movement contracts spring 17 and when fully contracted, the forcible urging of the line 13 about the reel will cause the mount 20 to pivot in a clockwise direction, causing the pinion to be out of mesh with the drive gear 27, as shown in FIG. 3. At this time, the reel is released for free rotation and expansion of spring 17 in the direction of the arrow shown will toss the article from the stationary base. Once the toss has taken place, the weight of the motor will cause the mount 20 to rotate in a counterclockwise direction so that the pinion 26 is reengaged and in mesh with the gear 27 so that the reel will be forcibly urged in a counterclockwise direction to reel in the weighted object via the line 13.

In view of the foregoing, it can be seen that a stationary base is provided from which the weighted object is tossed and retracted. By means of the limited pivotal movement of the mount 20 on which the propulsion means is carried and the motor means is carried and separated by the pivot 23, engagement and disengagement of the motor means with the reel is provided. Although an electrical means, such as a battery, is illustrated, it is to be understood that the device will also operate from a power source such as a household line source. Also, it is to be understood that other means can be provided for propelling the weighted object from the stationary housing and for retracting, and that the means shown is by way of example.

It is to be noted that the knob 42 and rod 43 serve as a delay to retard the time required for the motor gear 26 to engage with the reel driven gear 27. This delay occurs after expansion of the spring 17 as the motor means is pivoting counterclockwise to bring the pinion gear 26 into engagement with the gear 27. The tighter the knob draws the rod 43 into contact with element 22, the slower will be the gravity drop or pivot of the motor and mount 20 about pivot 23.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A static cat toy for propelling and retracting a missile therefrom comprising the combination of:

a stationary and non-movable base constituting an anchor;

means operably mounted in said base for propelling an article attractive to a cat;

means operably mounted in said base for retracting said article;

release means pivotally carried on said stationary base operable in response to said propelling and said retraction means for alternately propelling and retracting said article; and motor means carried on said release means movable between two positions for engaging and disengaging with said retraction means and alternating between said positions in response to pivotal movement of said release means;

said retraction means including a rotatable drum selectively engageable by said motor means;

a line having one end attached to said drum and the other attached to said article; and said line cooperates with said propelling means to compress a spring when said motor means is engaged with said drum.

2. The invention as defined in claim 1 wherein:

said release means is an elongated mount with a pivot at its midsection carried on said stationary base;

one end of said mount connected to said spring and said motor means carried on the opposite end of said mount;

said motor means normally biased out of engagement with said drum in response to compression of said spring.

* * * * *